(12) United States Patent
Longe

(10) Patent No.: US 8,593,406 B2
(45) Date of Patent: Nov. 26, 2013

(54) INTERCHANGEABLE INPUT MODULES ASSOCIATED WITH VARYING LANGUAGES

(75) Inventor: Michael R. Longe, Seattle, WA (US)

(73) Assignee: Tegic Communications, Inc., Seattle, WA (US)

( * ) Notice: Subject to any disclaimer, the term of this patent is extended or adjusted under 35 U.S.C. 154(b) by 926 days.

(21) Appl. No.: 12/532,400

(22) PCT Filed: Mar. 21, 2007

(86) PCT No.: PCT/US2007/064515
§ 371 (c)(1),
(2), (4) Date: Mar. 15, 2010

(87) PCT Pub. No.: WO2008/115237
PCT Pub. Date: Sep. 25, 2008

(65) Prior Publication Data
US 2010/0188338 A1    Jul. 29, 2010

(51) Int. Cl.
*G06F 3/02* (2006.01)
(52) U.S. Cl.
USPC .......................................................... 345/168
(58) Field of Classification Search
USPC .............. 345/168, 169, 172, 173; 341/22, 23; 704/3, 7; 400/477; 434/159; 178/18.01
See application file for complete search history.

(56) References Cited

U.S. PATENT DOCUMENTS

| 5,387,042 A | 2/1995 | Brown |
| 7,567,236 B2 * | 7/2009 | Nakayama et al. ........... 345/168 |
| 2002/0151992 A1 | 10/2002 | Hoffberg et al. |
| 2003/0028451 A1 | 2/2003 | Ananian |

OTHER PUBLICATIONS

International Preliminary Report on Patentability mailed Oct. 1, 2009 in parallel PCT application No. PCT/US/07/64515, 8 pages.

* cited by examiner

*Primary Examiner* — Abbas Abdulselam
(74) *Attorney, Agent, or Firm* — Michael A. Glenn; Perkins Coie LLP

(57) ABSTRACT

Interchangeable input modules, such as keypads, having user input devices configured to mate with base devices are described herein. The user input devices may include pluralities of inputs, such as input keys, associated with languages. The interchangeable input modules may further include storage components configured to store configuration data, linguistic structures, and/or predictive logic. Additionally, the interchangeable input modules may have interfaces configured to electrically couple the interchangeable input modules to the base devices after the interchangeable input modules are mated with the base devices.

25 Claims, 8 Drawing Sheets

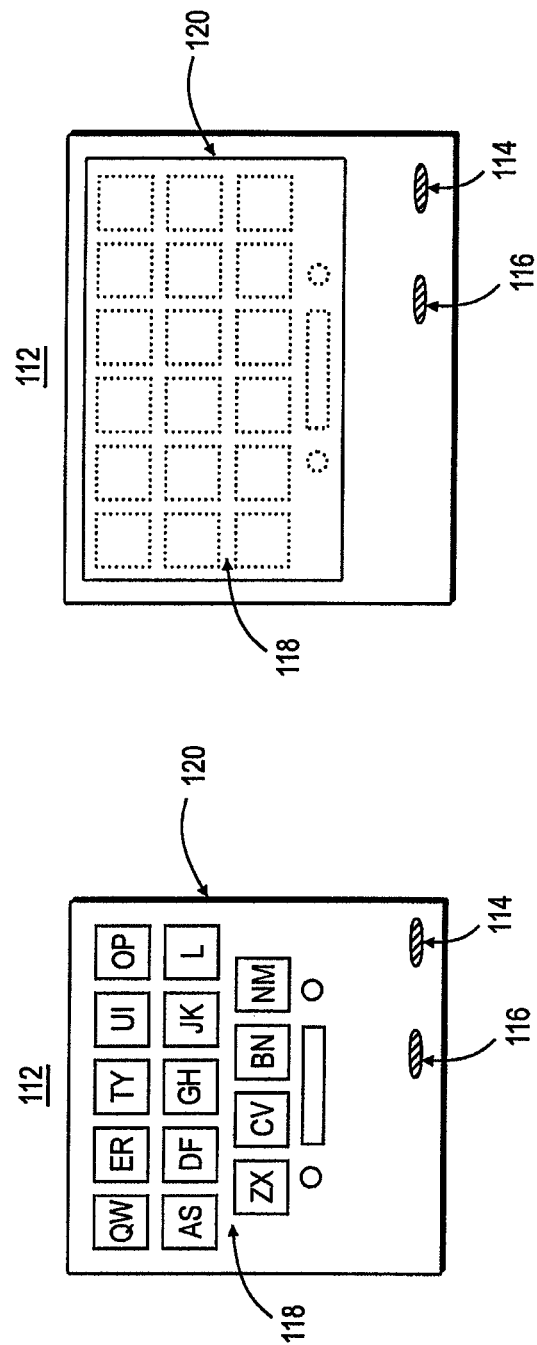

INTERCHANGEABLE INPUT MODULES ASSOCIATED WITH VARYING LANGUAGES

CROSS REFERENCE TO RELATED APPLICATIONS

This application is a national phase entry of PCT patent application Ser. No. PCT/US07/64515, filed Mar. 21, 2007, which is incorporated herein in its entirety by this reference thereto.

FIELD OF THE INVENTION

The present invention relates to the field of interchangeable keypads, in particular, to interchangeable keypads associated with varying languages for base devices.

BACKGROUND OF THE INVENTION

Advances in wireless and cellular technologies have led to the global spread of mobile electronic devices, such as wireless mobile phones and personal digital assistants (PDAs). Such devices are designed for and sold in many markets, such as markets in the Americas, in Europe, in Asia, and in many other areas. Concurrent advances in processor speed and storage allow mobile electronic device manufactures to fit increasingly more applications and data on the devices, facilitating users of such devices in making phone calls, sending emails, messaging, and even in word processing. To accommodate such activities, mobile electronic devices often include a variety of multipurpose keys and keyboards to allow users to enter alphabetic, numeric, and other character input.

Each market has one or more languages, standard keyboards, and/or methods for text input, such as the "AZERTY" and 'QWERTZ" keyboard layouts for France and Germany and the kana keyboard for Japan. A mobile phone in the European market may be configured to display menus and enter text in one of a dozen or more languages. Though mobile devices have standardized on the Touch-Tone™ keypad layout, with "ABC" on the 2 key, to support most Latin-based languages, keypad variations occur worldwide in order to support e.g. Cyrillic, Arabic, and Indic languages. Unlike desktop PC keyboards, where multiple letters and symbols for different languages may be printed on each keytop, the keys on mobile devices are too small to represent more than one or two languages.

The standards for keyboards and text input methods in each market are affected by a number of factors, including historical trends, business and government influences, literacy rates, and the availability of technology. For example, Zhuyin (Bo-PoMoFo) phonetic input is used in Taiwan whereas Pinyin phonetic input is used in Mainland China, but for many people in either population, handwriting recognition of the ideographic characters would be faster and easier than either phonetic method. And a new generation of people, growing up with video games and mobile phones, are as adept inputting with their thumbs as their grandparents were touch-typing on the typewriter.

Because of such regional differences, the same mobile electronic device may be produced in numerous variants, each variant having a keyboard associated with a different language, or even with a different layout within the same language. For example, one mobile electronic device may be produced such that a user can purchase the device with either an English language keyboard or a Russian language keyboard. Further, the same device may be produced with English-language keyboard layout variants, such as a QWERTY keyboard layout variant or a Dvorak keyboard layout variant. Variants of the same device may also be produced with a 12-key phone keypad, a QWERTY thumbboard, or a pair of 8-way rocker switches. The need to produce so many variants of the same mobile electronic device is a burden on producers and results in higher device costs as well as inventory and distribution headaches.

BRIEF DESCRIPTION OF THE DRAWINGS

The present invention will be described by way of exemplary embodiments, but not limitations, illustrated in the accompanying drawings in which like references denote similar elements, and in which:

FIGS. 1a-1d illustrate overviews of interchangeable keypads as used with base devices, in accordance with various embodiments;

DETAILED DESCRIPTION OF EMBODIMENTS OF THE INVENTION

Figure 1A:
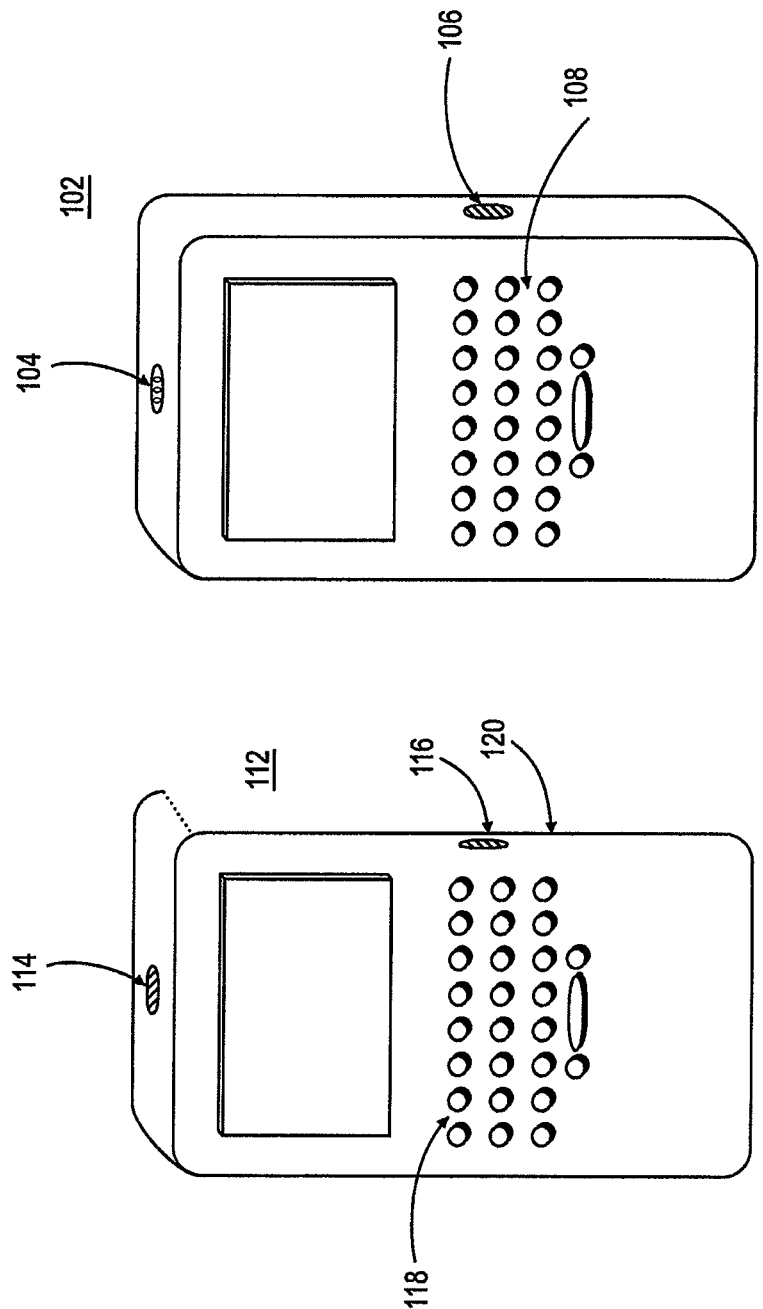

Illustrative embodiments of the present invention include, but are not limited to, interchangeable input modules, such as keypads, having user input devices configured to mate with base devices. The user input devices may include pluralities of inputs, such as input keys, associated with languages. The interchangeable input modules may further include storage components configured to store configuration data, linguistic structures, and/or predictive logic. Additionally, the interchangeable input modules may have interfaces configured to electrically couple the interchangeable input modules to the base devices after the interchangeable input modules are mated with the base devices.

Parts of the description will be presented in terms such as portable or mobile electronic devices. As well understood by those skilled in the art, the term "base device" as used herein including the claims, comprises wireless mobile phones, personal digital assistants (PDAs), media players, personal computers (PCs), kiosks, copiers, and the like.

The term "input module" may include a plurality of possible input devices, such as keyboards of keypads, joysticks, and reduced keypads, but may include any sort of input device known in the art.

The term "wireless mobile phone", as used herein, refers to the class of telephone devices equipped to enable a user to make and receive calls wirelessly, not withstanding the user's movement, as long as the user is within the communication reach of a service or base station of a wireless network service provider. Wireless mobile phones include both devices of digital and analog subclasses.

The terms "actuation" and "activation", as used herein, refer to an affirmative action by a user to provide a value, such as a language element or elements or a function associated with a key, as input to a base device. Key actuations may include a traditional mechanical key that, when pressed, causes the key to contact a switch on a circuit board located beneath the key. Alternatively, key activations may mean the touching by a user (or stylus) of a pressure sensitive key or a capacitive or resistive touch sensitive surface/display. "Key actuation," as used herein, also covers other forms of input, such as stylus gestures, which represent one or more language elements or a software function, or tilting a joystick or rocker switch in one of a plurality of directions, each direction representing a language element. The term "language element," as used herein, refers to a letter, accented or unaccented, or other character or symbol that represents a phonetic or subword component, including Japanese kana, Korean jamo, and Chinese pinyin, zhuyin, or strokes, or other linguistic and non-linguistic character such as a digit or a diacritic or a punctuation mark that is contained in abbreviations, chat slang, emoticons, user IDs, or URLs.

The term "user input device," as used herein, refers to any input device having defined areas including, but not limited to, an input device having a defined area containing a plurality of defined locations, such as input keys, associated with one or more characters and, in particular but not limited to, virtual keyboards, which shall include by way of example, but not limitation, laser-projection keyboards, muscle-sensing keyboards, and fabric keyboards.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation. The phrase "in one embodiment" is used repeatedly. The phrase generally does not refer to the same embodiment; however, it may. The terms "comprising," "having," and "including" are synonymous, unless the context dictates otherwise. The phrase "A/B" means "A or B". The phrase "A and/or B" means "(A), (B), or (A and B)". The phrase "at least one of A, B and C" means "(A), (B), (C), (A and B), (A and C), (B and C) or (A, B and C)". The phrase "(A) B" means "(B) or (A B)", that is, A is optional.

FIGS. 1a-1d illustrate overviews of interchangeable keypads as used with base devices, in accordance with various embodiments. As illustrated, a base device 102 may be capable of mating with one or more interchangeable input modules, such as interchangeable keypads 112, one at a time. Each interchangeable input module, such as interchangeable keypad 112, may have a user input device 120 comprising a plurality of inputs, such as plurality of input keys 118, the keys 118 associated with a language, the languages of the keypads 112 varying from keypad to keypad, in some embodiments. Thus, keypads 112 facilitate device 102 users in adding keys 118 of a variety of languages to base device 102. In some embodiments, base device 102 may comprise an additional plurality of input keys 108, the keys 108 having the same or a language from keys 118 of keypad 112.

In various embodiments, keypad 112 may comprise a storage component 116 storing configuration data, linguistic structures, and/or predictive logic, and may transmit, via interface 114, the data, structures, and/or logic to base device 102 upon mating of keypad 112 with the base device 102. The configuration data of storage component 116 may enable base device 102 to recognize the electronic signals of keypad 112, corresponding to key 118 actuations, as language elements of the language of keypad 112. The linguistic structure may contain a plurality of strings comprised of character elements of the language of the keypad 112, at least one or these strings being a word of the language. In other embodiments, the linguistic structure may additionally or instead comprise menus and/or components associated with the language. The predictive logic, when operated by a receiving base device 102, may allow the base device 102 to predict one or more strings/words of the keypad 112 language based on an analysis of key 118 actuations in view of strings/words of the linguistic structure. In some embodiments, base device 102 may comprise a storage component 106 capable of storing configuration data, linguistic structures, and/or predictive logic received from keypad 112, the data, structures, and/or logic allowing base device 102 to recognize and/or process the electronic signals received from keypad 112.

In other embodiments, storage component 116 may be adapted to receive signals from user input device 120, translate the signals into codes corresponding to language elements of the language of the keypad 112, and output the translated codes to the interface.

As is further shown, each of keypad 112 and base device 102 may comprise an interface 114/104, the interfaces 104 and 114 electronically coupling with each other after the keypad 112 is mated with base device 102, thus transmitting the above mentioned configuration data, linguistic structure, predictive logic, electronic signals, and/or translated codes from keypad 112 to base device 102.

In various embodiments, base device 102 may be any sort of electronic device known in the art, such as a wireless mobile phone, a PDA, a media player, a laptop computer, a PC, a set-top box or remote control, a game controller, an in-vehicle navigation console, medical equipment, a kiosk, or a copier. In one embodiment, base device 102 may only be operable after being mated with keypad 112. As mentioned above, base device 102 may comprise an interface 104, a storage component 106, and, optionally, a plurality of input keys 108, but may also include numerous other components, such as a display, speakers, other processes, other input/output mechanisms, or any other component known in the art. An exemplary base device 102 is shown in greater detail in FIG. 3 and is discussed further below in reference to that figure.

Figure 1B:
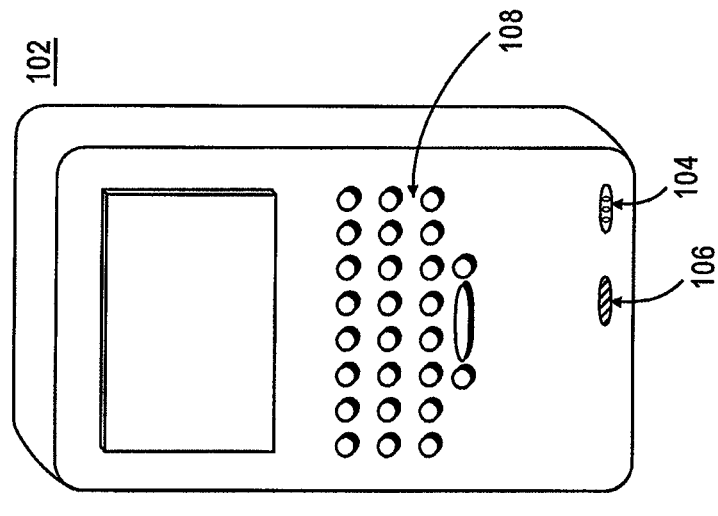
Figure 2:
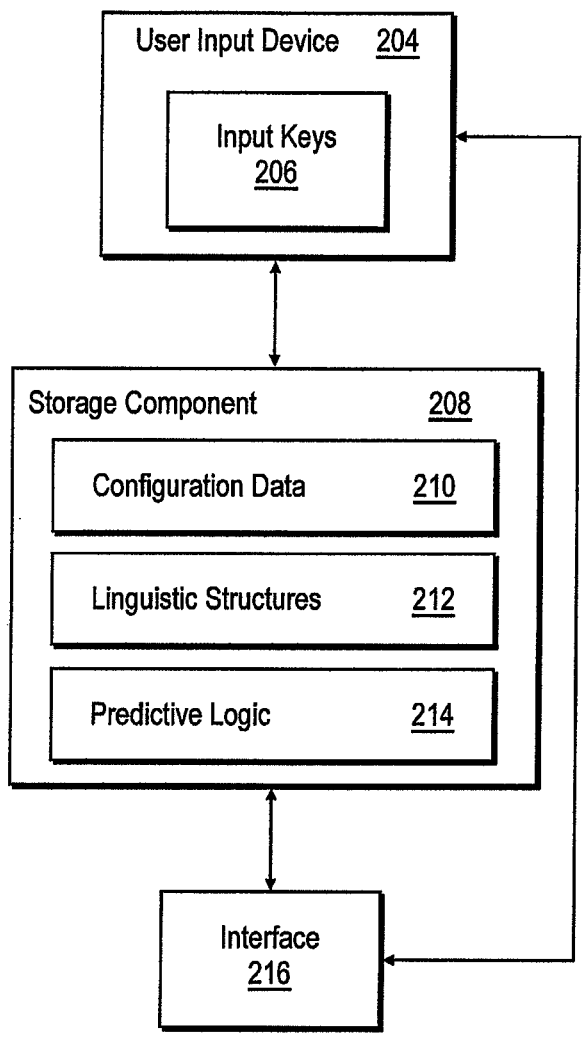
FIG. 2 illustrates an exemplary interchangeable keypad, in accordance with various embodiments.
Figure 3:
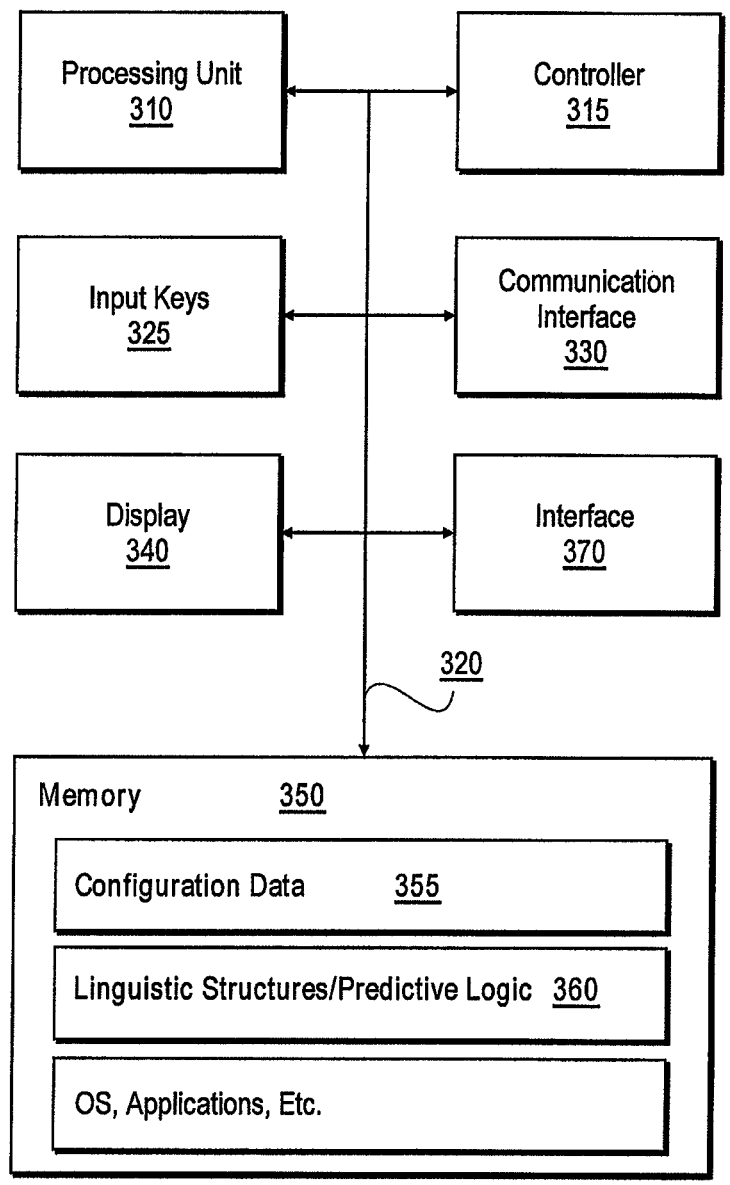
FIG. 3 illustrates an exemplary base device, in accordance with various embodiments.

As is shown, interfaces 104 and 114 of base device 102 and keypad 112, respectively, may be any sort of interfaces known in the art. Interface 114 is represented by a shaded area on keypad 112, as interface 114 is on the "back side" of keypad 112 and thus cannot be seen in FIGS. 1a-1d. Exemplary interfaces, such as wireless and contact pad interfaces, are discussed below in greater detail in references to FIGS. 2 and 3. Interface 114 of keypad 112 may be attached to and electrically coupled to user input device 120 and storage component 116, in some embodiments through one or more connecting traces. Interface 114 may further be configured to electrically couple storage 116 and user input device 120 to base device 102 after interchangeable keypad 112 is mated with base device 102. Interface 104 of base device 102, may, in turn, be electrically coupled to storage 106, in some embodiments through one or more connecting traces. Interface 104 may further be configured to electrically couple storage 106 to keypad 112 after keypad 112 is mated with base device 102. Thus, after base device 102 and keypad 112 are mated, interface 114 may transmit electronic signals to interface 104, electrically coupling the mated components. In some embodiments, each of interfaces 104 and 114 may be placed in any position on base device 102 and keypad 112, respectively, provided that the interfaces 104 and 114 contact after keypad 112 and base device 102 are mated. In various embodiments, storage component 106 of base device 102 may be any sort of memory known in the art. Storage component 106 is represented by the shaded area on base device 102, as storage 106 is within base device 102 and thus cannot be seen in FIGS. 1a-1d. An exemplary storage component 106 is illustrated in FIG. 3 as memory 350, and is described in greater detail below in reference to that figure. As mentioned above, storage 106 may, in some embodiments, receive and store configuration data enabling base device 102 to recognize electronic signals received from keypad 112 as corresponding to language elements of the language associated with the cover. As is also mentioned storage device 106 may also receive and store linguistic structures and/or predictive logic. The data, structures, and/or logic may be received from keypad 112 after keypad 112 is mated with device 102.

As is further shown, base device 102 may have a plurality of input keys 108. Keys 108 may be an optional component of base device 102, attached to some base portions 102, but not to others. Keys 108 may have an input arrangement of a language. Exemplary input arrangements, such as those illustrated by FIG. 4 and described below, may include QWERTY, modified-QWERTY, Dvorak, or numeric keyboard layouts. Exemplary languages, such as those illustrated by FIG. 5 and described below, may include Japanese, Hebrew, Russian, French, Greek, and Chinese. In some embodiments, keys 108 may comprise a reduced keypad, similar to the reduced keypad 118 illustrated for keypad 112 in FIG. 1c and the 12-key phone keypad in FIG. 4, with at least some of the keys 108 each being associated with multiple language elements of a language. In various embodiments, the input arrangement and/or language of keys 108 may differ from the input arrangement and/or language of keys 118. Thus, mating a keypad 112 with base device 102 may allow a base device 102 user to customize the language and/or input arrangement. When attached, keypad 112's keys 118 may supersede keys 108 of base device 102.

As illustrated, keypad 112 may comprise any sort of interchangeable keypad known in the art. Exemplary keypads 112 are illustrated in FIG. 2 and are described below in greater detail in reference to that figure. In one embodiment, keypad 112 may comprise a user input device 120 having a plurality of input keys 118, a storage component 116, and an interface 114 attached to user input device 120 and storage component 116, as is mentioned above. As is also discussed below in regard to FIG. 2, user input device 120 may be made of any sort of material known in the art, and may have any shape or size, so long as user input device 120 is adapted to mate with base device 102. Each of storage 116 and interface 114 may be located on any surface of user input device 120, and in some embodiments may be embedded in user input device 120. As is further discussed above, each interchangeable keypad 112 may be customized for a specific language of plurality of input keys 118, facilitating a base device 102 user in customizing base device 102 with varying languages of input keys 118. In various embodiments, storage component 116 may comprise any sort of memory known in the art. Storage component 116 is represented by a shaded area on keypad 112, as storage 116 is on the "back side" of keypad 112 and thus cannot be seen in FIGS. 1a-1d. An exemplary storage component is described below in greater detail with reference to FIG. 2. As is mentioned above, storage 116 is an optional component that may be highly desirable in embodiments to provide base device 102 with configuration data associated with the language of keys 118, with linguistic structures having strings/objects and/or menus/components associated with the language of the keypad 112, and with predictive logic. Storage 116 may store such configuration data, linguistic structures, and/or predictive logic associated with the language of the keys 118, and may output the data, structures, and/or logic responsive to the mating of the keypad 112 with the base device 102. The configuration data may include one or both of information identifying the language and the input mechanism and a linguistic database of the language. The linguistic structure may contain a plurality of strings comprised of character elements of the language(s) supported by the keypad 112, at least one or these strings being a word of the language. The linguistic structure may also contain specification of graphical menus or components associated with the language. The predictive logic, when operated by a receiving base device 102, may allow the base device 102 to predict one or more strings/words of the keypad 112 language based on an analysis of key 118 actuations in view of strings/words of the linguistic structure. Exemplary predictive logic and linguistic structures are discussed below in greater detail in reference to FIG. 2. Additionally, in one embodiment, storage 116 may be configured to receive electronic signals from user input device 120 in response to actuations of keys 118, may translate those signals into codes corresponding to language elements of the language of keypad 112, the codes being codes that are recognizable by base device 102 as the language elements, and may provide the codes to interface 114 for transmission to base device 102.

As is shown, interchangeable keypad 112 may have a user input device 120 capable of mating with the base device 102. The user input device 120 may cover multiple surfaces of the base device 102, as is shown in FIG. 1a, may cover a single surface, or may only partially cover a single surface, as is shown in FIGS. 1b-1d. In some embodiments, such as those illustrated by FIGS. 1a-1c, user input device 120 may comprise a plurality of physical input keys 118 made of the same or different material than the rest of user input device 120. Such physical input keys 118 may each be coupled to a switch of a plurality of switches. Each switch may be configured to transmit an electronic signal when the corresponding input key 118, coupled to the switch, is actuated. The electronic signal may be a signal recognizable by base device 102 as corresponding to one or more language elements of the language (if base device 102 has received corresponding configuration data from storage 116), and may be transmitted by the switches to storage component 116 or interface 114.

In other embodiments, such as those illustrated by FIG. 1d, user input device 120 may be a touch sensitive display capable of rendering electronic input keys 118, detecting a touch location, and measuring distances between the touch location and keys 118 those are proximally close to the touch location. Such electronic keys 118 may have the same language and input arrangement as physical keys 118. In yet other embodiments, rather than rendering electronic keys 118, user input device 120 may detect the writing of a character or characters by a user on its touch sensitive display, and may predict the character or characters using predictive logic of storage 116. As is shown in FIG. 1c, user input device 120 may, in some embodiments, comprise a reduced keypad, with at least some of the keys 118 corresponding to more than one language element. Signals corresponding to these keys 118 may then be disambiguated by predictive logic of storage 116. The keys 118 of the reduced keypad may be physical keys, as is shown, or may be electronic keys, if user input device 120 is a touch sensitive display. In various embodiments, plurality of input keys 118 may have any sort of language known in the art. Exemplary languages, such as those illustrated by FIG. 5 and described below, may include Japanese, Hebrew, Russian, French, Greek, and Chinese. In some embodiments, input keys 118 may also have an input arrangement. Exemplary input arrangements, such as those illustrated by FIG. 4 and described below, may include QWERTY, modified-QWERTY, Dvorak, or numeric keyboard layouts.

In some embodiments, keys 118 of device 120 may include or be replaced by one or more of joysticks, thumb keys, soft keys, and any other sort of input device known in the art.

Figure 1B:
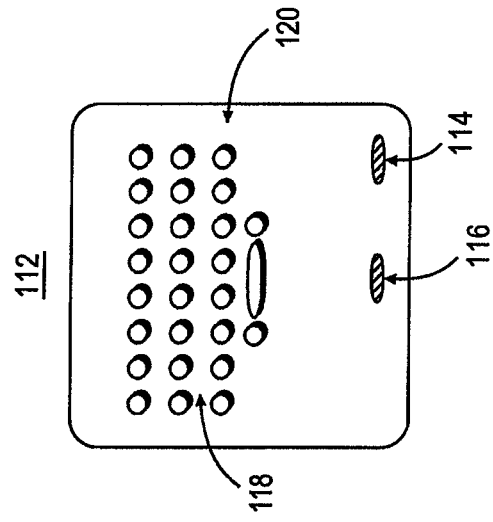

FIG. 2 illustrates an exemplary interchangeable keypad, in accordance with various embodiments. As illustrated in FIG. 2, an interchangeable keypad 202 may comprise a user input device 204 having a plurality of input keys 206, a storage component 208 attached to the user input device 204, and an interface 216 coupled to the storage component 208. Storage component 208 may store configuration data 210, linguistic structures 212, and/or predictive logic 214. The various operations and interactions of these components are described above in detail in reference to FIG. 1.

Further referring to FIG. 2, the user input device 204 may be made of any sort of material known in the art. User input device 204 may comprise, partially or entirely, a rigid material such as plastic, metal, wood, paper, laminates, or combinations thereof. In other embodiments, user input device 204 may comprise a conformal elastomeric membrane or a flexible material. In yet other embodiments, user input device 204 may comprise a capacitive or resistive touch sensitive display or surface capable of rendering keys 206 and/or detecting touch sensing, such as touching with a human finger or a stylus. Further, user input device 204 may have any sort of shape and may cover at least partially one or more surfaces of the base device. In some embodiments, user input device 204 may have a shape which facilitates mating with the base device, with the shape at least enabling interface 216 to mate with an interface of the base device.

The plurality of input keys 206 of the user input device 204, when they are physical keys, may also be made of any material, rigid, conforming, or flexible, and may be found on any one or more surfaces of user input device 204. In other embodiments, plurality of input keys 206 may be electronic keys of user input device 204, rendered on a touch sensitive display of user input device 204. Keys 206 may be of any number. For example, keys 206 may include a key for each letter of an alphabet, each character of a language, and/or each of a range of numbers, such as 0-9. In other embodiments, such as that illustrated by FIG. 1c, keys 206 may comprise a reduced keypad, with multiple alphanumeric and/or character values assigned to at least ones of the keys 206. In various embodiments, keys 206 may be a plurality of buttons, physical or electronic, most or all of which have the same size. In one embodiment, keys 206 may include, or be replaced by, a joystick or two. Keys 206 may have any shapes and/or sizes, however, known in the art. The sizes of the keys 206 may, in some embodiments, be determined by the number of keys 206 and the available space on user input device 204.

In various embodiments, physical input keys 206 of input device 204 may be correspondingly coupled to a plurality of switches, each key 206 coupled to a switch. The switches may in turn be electrically connected to storage 208 and/or interface 216 to enable switches to transmit electronic signals to storage 208/interface 216. Such an electrical connection may be achieved in any manner known in the art, such as through traces. Each of the switches may comprise a number of open and/or closed gates capable of forming a binary value electronic signal when the key 206 coupled to the switch is actuated. As illustrated, interchangeable keypad 202 may have a storage component 208 attached to user input device 204. Storage component 208 may store configuration data 210 related to keys 206, linguistic structures 212 having words/strings/objects of the language of keys 206, and/or predictive logic 214. In various embodiments, storage component 208 may comprise a memory device such as a subscriber identity module (SIM), a read only memory (ROM), a programmable read only memory (PROM) device, an electrically erasable programmable read only memory (EEPROM) device, and the like. In other embodiments, storage component 208 may comprise an integrated circuit (IC), such as a custom IC, a central processing unit (CPU), a microcontroller, an application-specific integrated circuit (ASIC), an application-specific standard product (ASSP), and the like.

As is described in greater detail above, configuration data 210 may include one or both of information identifying the language and the input mechanism of user input device 204. The linguistic structure 212 may contain a plurality of strings comprised of character elements of the language of the keypad, at least one or these strings being a word of the language. In some embodiments, the linguistic structure 212 may also or instead include specification of graphical menus and/or components of the language of keypad. The predictive logic 214, when operated by a receiving base device, may allow the base device to predict one or more strings/words of the keypad language based on an analysis of key actuations in view of strings/words of the linguistic structure.

In various embodiments, where the user input device 204 is a touch sensitive display, the predictive logic 214 may compare coordinates of one or more contact locations where the user has actuated the input device 204 to coordinates of electronic keys 206 to determine at least one intended actuation. Predictive logic 214 may then compare the possible combinations of intended actuations to the strings/objects of the linguistic structure 212, and may then predict one or more intended words/strings of the language of the user input device 204 based on structure 212. In one embodiment, in addition to storing words/strings, structure 214 may also store a ranking associated with each word/string, which may be incremented based on user selection of the word/string. Such predictive logic is described in greater detail in U.S. Pat. No. 7,088,345, entitled "Keyboard System with Automatic Correction" and issued on Aug. 8, 2006, which is fully incorporated herein by this reference.

In some embodiments, wherein user input device 204 has a reduced keypad 206, at least one of the keys 206 being associated with multiple language elements, predictive logic 214 may compare possible combinations of the language elements of actuated keys 206 to words/strings of linguistic structure 212 to predict an intended word/string in the language of the input device 204. Such predictive logic 214 is described in greater detail in U.S. Pat. No. 6,286,064, entitled "Reduced Keyboard and Method for Simultaneous Ambiguous and Unambiguous Text Input" and issued on Sep. 4, 2001, which is fully incorporated herein by this reference. In one embodiment, wherein user input device 204 has a touch sensitive surface for detecting handwritten characters, predictive logic 214 may determine a number of candidate characters of the language of the user input device 204 that most closely match the handwritten character(s). Predictive logic 214 may then compare possible combinations of the determined characters to words/strings of linguistic structure 212 to predict an intended word/string in the language of the input device 204. Such predictive logic 214 is described in greater detail in U.S. Patent Publication No. 2005/0234722, entitled "Handwriting and Voice Input with Automatic Correction" and published on Oct. 20, 2005, which is fully incorporated herein by this reference. Another embodiment, where directional inputs may represent language elements, is described in greater detail in U.S. Patent Publication No. 2004/0070567, entitled "Directional Input System with Automatic Correction" and published on Apr. 15, 2004, which is fully incorporated herein by this reference.

In some embodiments, interface 216 may receive electronic signals from user input device 204 and/or storage 208 and may transmit the signals to a corresponding interface of a base device after the base device is mated with the keypad 202. Interface 216 may be implemented with a universal asynchronous receiver/transmitter (UART) device or may be implemented with a "blue tooth" transceiver for wirelessly communicating with the base device. In other embodiments, interface 216 may comprise contact pads capable of transmitting electronic signals after being mated with contact pads of the base device.

FIG. 3 illustrates an exemplary base device 300, in accordance with various embodiments. Those of ordinary skill in the art and others will appreciate that base device 300 may include many more components than those shown in FIG. 3. However, it is not necessary that all of these generally conventional components be shown in order to disclose an enabling embodiment for practicing the present invention. As shown in FIG. 3, base device 300 may include an optional (wire line based or wireless) communications interface 330 for connecting to remote device(s) (not shown). Communications interface 330 may include the necessary circuitry, driver and/or transceiver for such a connection and may be constructed for use with the appropriate protocols for such a connection.

Further, base device 300 may optionally comprise a plurality of attached input keys 325. As with the plurality of input keys of the user input device of the interchangeable keypad, discussed above with regard to FIG. 1, keys 325 may have an input arrangement of a language, which may or may not be the same input arrangement and/or language as the input arrangement and language of the plurality of input keys of the user input device of the interchangeable keypad. In other embodiments, base device 300 may not have plurality of input keys 325, and thus may only provide users with input keys after an interchangeable keypad having such keys is mated with base device 300, or the base device input keys may be used only for language-independent functions such as cursor navigation or volume.

Base device 300 may also include a processor or processing unit 310, a controller 315, a display 340, and a memory 350, all interconnected along with the communications interface 330 via a bus 320. Memory 350 may generally comprise a random access memory ("RAM"), a read only memory ("ROM") and a non-volatile mass storage device, such as a flash memory or the like. Memory 350 may store configuration data 355 enabling base device 300 to recognize electronic signals received from the interchangeable keypad, as described above. In other embodiments, memory 350 may receive configuration data 355, in addition to other electronic signals, from the interchangeable keypad, and may store the received configuration data 355. Additionally, memory 350 may receive linguistic structures and/or predictive logic 360, from the interchangeable keypad, and may store one or both of linguistic structures and/or predictive logic 360, the structures and logic discussed above in greater detail. In one embodiment, memory 350 may also store an OS, applications, etc.

It will be appreciated that software components of memory 350 may be loaded from a computer readable medium into memory 350 of base device 300 using a drive mechanism (not shown) or network mechanism (not shown) associated with the computer readable medium, such as a floppy, tape, DVD/CD-ROM drive, flash RAM, SIM card, network interface card, or communications interface 330.

Further, communication interface 330 may be designed to support one or more signaling protocols, including but not limited to Code Division Multiple Access ("CDMA"), Time Division Multiple Access ("TDMA"), Global System for Mobile Communications ("GSM"), General Packet. Radio Service ("GPRS") and so forth. Moreover, communication interface 330 may be implemented using a separate transmitter and receiver.

As is also shown, in some embodiments, base device 300 may include an interface 370. Interface 370 may receive electronic signals from a corresponding interface of an interchangeable keypad, after base device 300 is mated with an interchangeable keypad, and may transmit those signals to memory 350. Interface 370 may be implemented with a universal asynchronous receiver/transmitter (UART) device or may be implemented with a "blue tooth" transceiver for wirelessly communicating with the interchangeable keypad. In other embodiments, interface 370 may comprise contact pads capable of transmitting/receiving electronic signals after being mated with contact pads of the interchangeable keypad.

Figure 4:
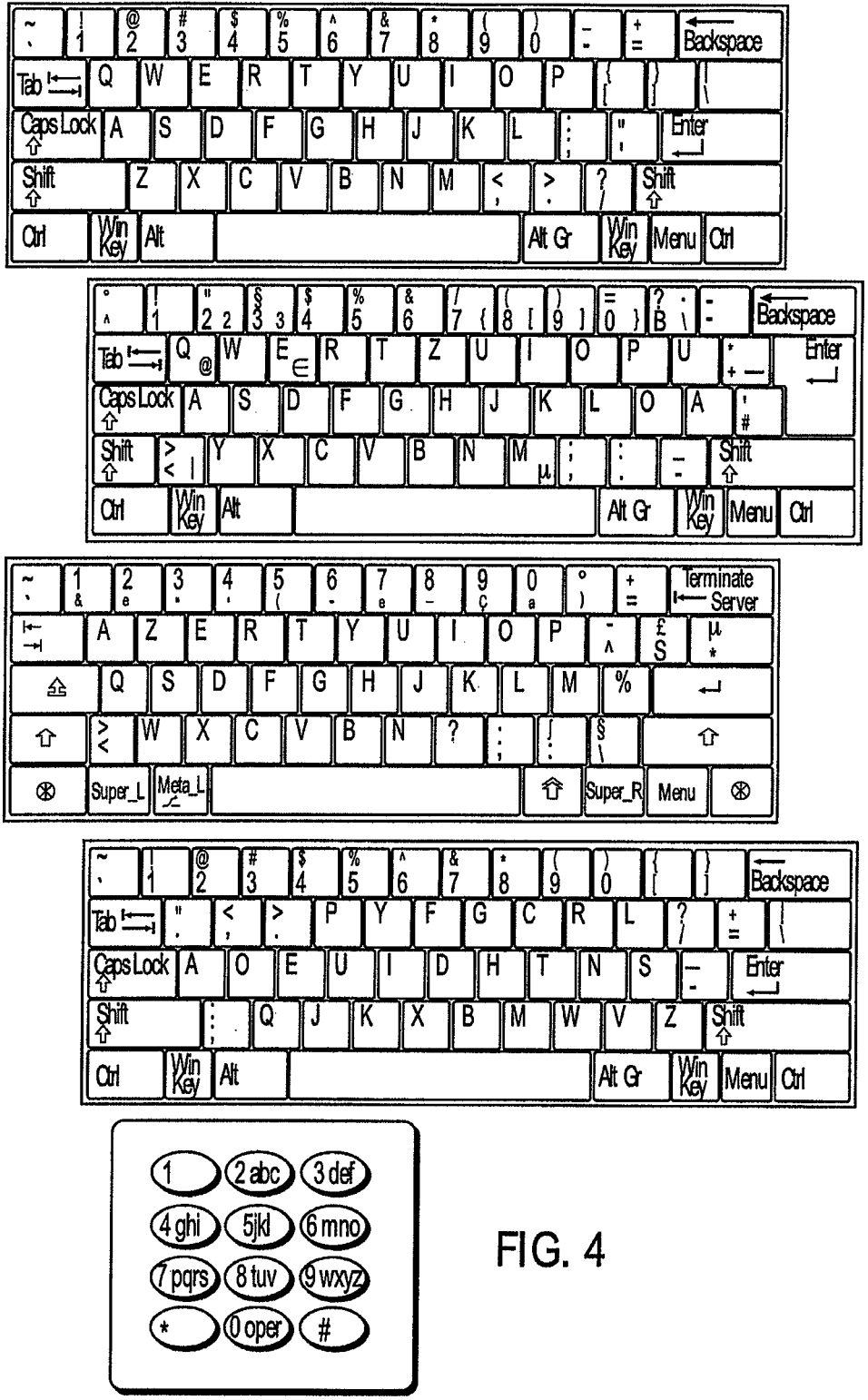
FIG. 4 illustrates a plurality of input arrangements for input keys of a user input device of an interchangeable keypad, in accordance with various embodiments.

FIG. 4 illustrates a plurality of input arrangements for input keys of a user input device of an interchangeable keypad, in accordance with various embodiments. The input arrangements illustrated by FIG. 4 are five exemplary input arrangements. Illustrated from left to right and top to bottom are input arrangements for the keyboard layouts QWERTY, QWERTZ, AZERTY, Dvorak, and standard 12-key phone. QWERTZ and AZERTY keyboard layout input arrangements are modified QWERTY layouts adapted for different countries and languages. QZERTY, another modified QWERTY layout mainly used in Italy, is not shown here. In some embodiments, a base device may have a keyboard layout with one of these input arrangements, and a user input device of an interchangeable keypad to mate with the base device may have a different keyboard layout of a different input arrangement. The keyboard layouts of differing input arrangements, such as those shown, may have the same language, such as English, or a differing languages, such as some being associated with the English language, and others with Russian.

Figure 5:
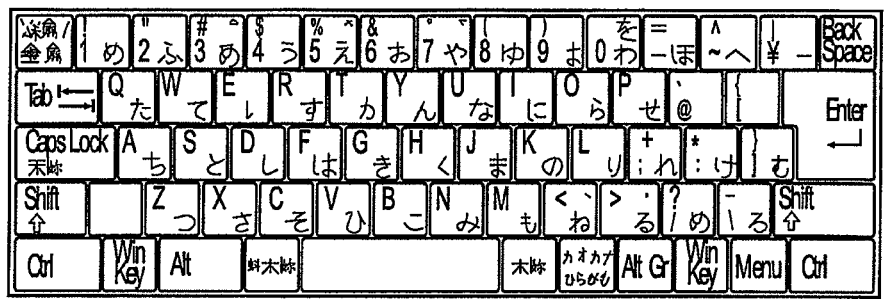
FIG. 5 illustrates a plurality of keyboard layouts of varying languages for a user input device of an interchangeable keypad, in accordance with various embodiments.
Figure 5:
Figure 5:
Figure 5:
Figure 5:
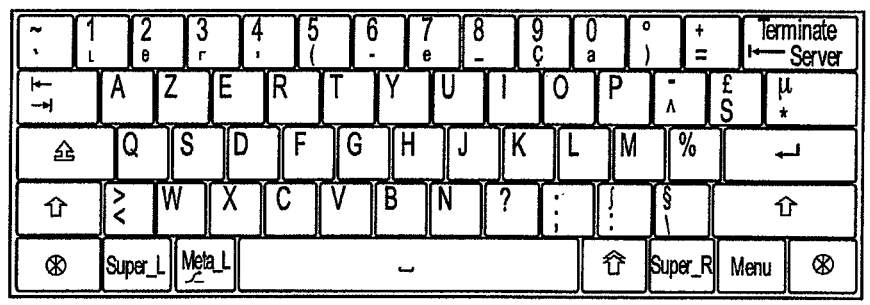
Figure 5:

FIG. 5 illustrates a plurality of keyboard layouts of varying languages for a user input device of an interchangeable keypad, in accordance with various embodiments. As used herein, "language" may include both alphanumeric and character-based languages. The keyboard layouts illustrated by FIG. 5 are six exemplary non-English language keyboard layouts. Illustrated from left to right and top to bottom are keyboard layouts for the languages Japanese, Hebrew, Russian, French, Greek, and Chinese. In some embodiments, a base device may have a keyboard layout of one of these languages, and a user input device of an interchangeable keypad to mate with the base portion may have a different keyboard layout of a different one of these languages. The keyboard layouts of differing languages, such as those shown, may have the same input arrangement, such as QWERTY or modified-QWERTY, or a differing input arrangements, such as some having a QWERTY arrangement and others a Dvorak arrangement.

Although specific embodiments have been illustrated and described herein, it will be appreciated by those of ordinary skill in the art that a wide variety of alternate and/or equivalent implementations may be substituted for the specific embodiments shown and described, without departing from the scope of the present invention. Those skilled in the art will readily appreciate that the present invention may be implemented in a very wide variety of embodiments or extended therefrom. This application is intended to cover any adaptations or variations of the embodiments discussed herein. Therefore, it is manifestly intended that this invention be limited only by the claims and the equivalents thereof.

What is claimed is:

1. An interchangeable input module configured to mate with a base device comprising:
   a user input device having a plurality of inputs associated with language elements of a language;
   a storage component configured to store configuration data associated with the language, the configuration data enabling the base device to recognize signals as corresponding to language elements of the language; and
   an interface coupled to the user input device and the storage component, the interface being configured to
   (1) electrically provide the configuration data to the base device after the interchangeable input module is mated with the base device, and
   (2) electronically provide to the base device signals corresponding to selective user interaction with the user input device, after the interchangeable input module is mated with the base device.

2. The interchangeable input module of claim 1, wherein the language is a selected one of an alphanumeric language and a character-based language.

3. The interchangeable input module of claim 1, wherein the user input device has a touch sensitive display, the touch sensitive display capable of rendering a plurality of keys as elements of the touch sensitive display.

4. The interchangeable input module of claim 1, wherein the storage component is further configured to store a linguistic structure associated with the language, the structure having one or more of a plurality of character strings, at least some of which are words of the language, and/or menus and other components related to the language, and the interface is further configured to electrically provide the linguistic structure to the base device after the interchangeable input module is mated with the base device.

5. The interchangeable input module of claim 4, wherein the storage component is further configured to store predictive logic capable of predicting one or more of the character strings of the language structure based on one or more user actuations of at least one of the plurality of inputs, and the interface is further configured to electrically provide the predictive logic to the base device after the interchangeable input module is mated with the base device.

6. The interchangeable input module of claim 1, wherein the plurality of inputs are further associated with an input arrangement, and the input arrangement is a selected one of a QWERTY keyboard layout, a Dvorak keyboard layout, a QWERTZ keyboard layout, an AZERTY keyboard layout, a QZERTY keyboard layout, an a numeric keyboard layout.

7. The interchangeable input module of claim 1, wherein the base device has an additional plurality of inputs, and the plurality of inputs of the interchangeable input module at least partially supersede the additional plurality of inputs after the interchangeable input module is mated with the base device.

8. The interchangeable input module of claim 7, wherein the additional plurality of inputs of the base device is associated with another language that is different from the language associated with the plurality of inputs of the interchangeable input module.

9. The interchangeable input module of claim 1, wherein the plurality of inputs include one or more of a keyboard, a reduced keypad, and/or a joystick.

10. An interchangeable keypad configured to mate with a base device comprising:
    a user input device having a plurality of input keys associated with language elements of a language;
    a storage component coupled to the user input device, the storage component configured to store
    (1) configuration data associated with the language,
    (2) a linguistic structure associated with the language, the structure having one or more of a plurality of character strings, at least some of which are words of the language, and/or menus or components associated with the language, and/or
    (3) predictive logic capable of predicting one or more of the character strings of the language structure based on one or more user actuations of at least one of the plurality of input keys, and
    the storage component is further configured to translate signals received from the user input device responsive to selective user interaction with the user input device, into codes indicative of language elements of the language; and
    an interface coupled to the user input device and the storage component, the interface being configured to
    (1) electrically provide the configuration data, the linguistic structure, and/or the predictive logic to the base device after the interchangeable keypad is mated with the base device, and
    (2) electronically provide the codes to the base device after the interchangeable keypad is mated with the base device.

11. The interchangeable keypad of claim 10, wherein the language is a selected one of an alphanumeric language and a character-based language.

12. The interchangeable keypad of claim 10, wherein the user input device has a touch sensitive display, the touch sensitive display capable of rendering the plurality of keys as elements of the touch sensitive display.

13. The interchangeable keypad of claim 10, wherein the plurality of input keys are further associated with an input arrangement, and the input arrangement is a selected one of a QWERTY keyboard layout, a Dvorak keyboard layout, a QWERTZ keyboard layout, an AZERTY keyboard layout, a QZERTY keyboard layout, an a numeric keyboard layout.

14. The interchangeable keypad of claim 10, wherein the base device has an additional plurality of input keys, and the plurality of input keys of the interchangeable keypad at least partially supersede the additional plurality of input keys when the keypad is mated with the base device.

15. The interchangeable keypad of claim 14, wherein the additional plurality of input keys of the base device are associated with another language that is different from the language associated with the plurality of input keys of the interchangeable keypad.

16. An apparatus comprising:
    a base device having an interface, the interface of the base portion capable of forming electrical connections with an interface of an interchangeable keypad when the keypad is mated with the base device; and
    the interchangeable keypad, mated with the base device, including a user input device configured to mate with the base device, the user input device having a plurality of input keys associated with language elements of a language, a storage component coupled to the user input device, the storage component configured to store
(1) configuration data associated with the language,
(2) a linguistic structure associated with the language, the structure having one or more of a plurality of character strings, at least some of which are words of the language, and/or menus or components associated with the language, and/or
(3) predictive logic capable of predicting one or more of the character strings of the language structure based on one or more user actuations of at least one of the plurality of input keys, and an interface coupled to the storage component, the interface being configured to
(1) electrically provide the configuration data, the linguistic structure, and/or the predictive logic to the base device after the interchangeable keypad is mated with the base device, and
(2) electronically provide signals corresponding to selective user interaction with the user input device, after the interchangeable keypad is mated with the base device.

17. The apparatus of claim 16, wherein the language is a selected one of an alphanumeric language and a character-based language.

18. The apparatus of claim 16, wherein the user input device has a touch sensitive display, the touch sensitive display capable of rendering the plurality of keys as elements of the touch sensitive display.

19. The apparatus of claim 16, wherein the base device is one of a wireless mobile phone, a personal digital assistant, a media player, a PC, a server, a set-top box or remote control, a game controller, an in-vehicle navigation console, medical equipment, a kiosk, or a copier.

20. An apparatus comprising:
a base device having an interface, the interface of the base portion capable of forming electrical connections with an interface of an interchangeable keypad when the keypad is mated with the base device; and
the interchangeable keypad, mated with the base device, including
a user input device having a plurality of input keys associated with language elements of a language,
a storage component coupled to the user input device, the storage component configured to store configuration data associated with the language and translate signals received from the user input device, responsive to selective user interaction with the user input device, into codes indicative of language elements of the language, and
an interface coupled to the user input device and the storage component, the interface being configured to
(1) electrically provide the configuration data to the base device after the interchangeable keypad is mated with the base device, and
(2) electronically provide the codes to the base device after the interchangeable keypad is mated with the base device.

21. The apparatus of claim 20, wherein the language is a selected one of an alphanumeric language and a character-based language.

22. The apparatus of claim 20, wherein the user input device has a touch sensitive display, the touch sensitive display capable of rendering the plurality of keys as elements of the touch sensitive display.

23. The apparatus of claim 20, wherein the storage component is further configured to store a linguistic structure associated with the language, the structure having a plurality of character strings, at least some of which are words of the language, and/or menus and other components related to the language, and the interface is further configured to electrically provide the linguistic structure to the base device after the interchangeable keypad is mated with the base device.

24. The apparatus of claim 23, wherein the storage component is further configured to store predictive logic capable of predicting one or more of the character strings of the language structure based on one or more user actuations of at least one of the plurality of input keys, and the interface is further configured to electrically provide the predictive logic to the base device after the interchangeable keypad is mated with the base device.

25. The apparatus of claim 20, wherein the base device is one of a wireless mobile phone, a personal digital assistant, a media player, a PC, a server, a set-top box or remote control, a game controller, an in-vehicle navigation console, medical equipment, a kiosk, or a copier.

* * * * *